US010750687B2

(12) United States Patent
Everett et al.

(10) Patent No.: US 10,750,687 B2
(45) Date of Patent: Aug. 25, 2020

(54) AUTOMATED NUTRIENT INJECTION SYSTEM

(71) Applicant: ROTO-GRO IP INC., Woodbridge, Ontario (CA)

(72) Inventors: Stephen C. Everett, Las Vegas, NV (US); Rick Wallace, Las Vegas, NV (US)

(73) Assignee: ROTO-GRO IP INC., Woodbridge, Ontario (CA)

( * ) Notice: Subject to any disclaimer, the term of this patent is extended or adjusted under 35 U.S.C. 154(b) by 285 days.

(21) Appl. No.: 15/814,327

(22) Filed: Nov. 15, 2017

(65) Prior Publication Data

US 2018/0132436 A1  May 17, 2018

Related U.S. Application Data

(60) Provisional application No. 62/422,587, filed on Nov. 15, 2016.

(51) Int. Cl.
| | |
|---|---|
| *A01G 31/00* | (2018.01) |
| *A01G 31/02* | (2006.01) |
| *G05D 11/13* | (2006.01) |
| *A01C 23/04* | (2006.01) |
| *A01G 27/00* | (2006.01) |
| *B05B 12/08* | (2006.01) |

(52) U.S. Cl.
CPC .......... *A01G 31/02* (2013.01); *A01C 23/042* (2013.01); *A01G 27/003* (2013.01); *B05B 12/085* (2013.01); *G05D 11/131* (2013.01); *G05D 11/139* (2013.01)

(58) Field of Classification Search
CPC .. A01G 2031/006; A01G 31/00; A01G 31/02; A01G 27/00; A01G 27/003; A01C 23/042
USPC .................................. 47/60, 62 R, 62 N, 63
See application file for complete search history.

(56) References Cited

U.S. PATENT DOCUMENTS

| | | | | |
|---|---|---|---|---|
| 4,992,942 A * | 2/1991 | Bauerle | ................. | A01G 31/00 700/284 |
| 5,135,174 A * | 8/1992 | Chaplinsky | .......... | A01C 23/042 239/310 |
| 5,184,420 A * | 2/1993 | Papadopoulos | ........ | A01G 31/00 47/62 N |
| 6,314,979 B1 * | 11/2001 | Lips | ..................... | A01C 23/042 137/205.5 |
| 8,721,758 B1 * | 5/2014 | Miller | .................. | A01C 23/042 239/727 |
| 8,979,969 B1 * | 3/2015 | Miller | .................... | A01G 25/00 239/727 |

(Continued)

*Primary Examiner* — Peter M Poon
*Assistant Examiner* — Danielle A Clerkley
(74) *Attorney, Agent, or Firm* — Donald J. Ranft; Collen

(57) ABSTRACT

An automated nutrient injection system is provided. The automated nutrient injection system comprises a nutrient mixing and delivery system coupled to a controller. The nutrient mixing and delivery system is configured to mix a predefined formula comprised of at least one nutrient and water. The controller is configured to receive, store, and execute user-defined settings of the nutrient mixing and delivery system. The controller comprises a remote display, wherein the remote display is viewable on a device physically remote from the nutrient mixing and delivery system.

19 Claims, 13 Drawing Sheets

(56) References Cited

U.S. PATENT DOCUMENTS

| | | | | |
|---|---|---|---|---|
| 8,986,417 B1* | 3/2015 | Miller | ............... | E02B 13/00 |
| | | | | 239/727 |
| 8,986,418 B1* | 3/2015 | Miller | ............... | E02B 13/00 |
| | | | | 239/727 |
| 9,148,993 B1* | 10/2015 | Miller | ............... | A01G 7/00 |
| 9,433,160 B2* | 9/2016 | Soohoo | ............ | A01G 31/02 |
| 2001/0048037 A1* | 12/2001 | Bell | ................ | A01C 23/042 |
| | | | | 239/70 |
| 2012/0192487 A1* | 8/2012 | Tanaka | ............ | A01G 31/02 |
| | | | | 47/60 |
| 2016/0050862 A1* | 2/2016 | Walliser | .......... | A01G 31/00 |
| | | | | 47/62 E |
| 2017/0105368 A1* | 4/2017 | Mehrman | ......... | A01G 31/06 |
| 2018/0035626 A1* | 2/2018 | Bailey | ............ | A01G 31/06 |
| 2018/0042215 A1* | 2/2018 | Proharam | ....... | A01M 7/0092 |

* cited by examiner

AUTOMATED NUTRIENT INJECTION SYSTEM

CROSS-REFERENCE TO RELATED APPLICATION

This application claims priority to U.S. Provisional Application No. 62/422,587, filed Nov. 15, 2016, which is hereby incorporated by reference in its entirety.

TECHNICAL FIELD

The present invention relates, generally, to nutrient injection systems and, more specifically, to an automated nutrient injection system.

BACKGROUND OF THE INVENTION

Nutrient injection systems are used to deliver various nutrients to plants. The success of a crop often relies on the nutrients fed to plants. Even a slight malfunction in the delivery of nutrients can be extremely costly, leading to plant death or the destruction of an entire crop. Moreover, the nutrients themselves are expensive. Therefore, nutrient waste caused by an ineffective nutrient injection system can also result in significant consequences.

Many existing nutrient injection systems inject nutrients directly into a delivery line as water is on its way to a plant. This prevents individual batches of predefined formulas, which makes it difficult to mix the formula properly and creates inconsistencies in the delivered formula over time. Systems that require hand-mixing of batches likewise create inconsistencies in mixing and formula composition because of human error.

In addition, existing systems do not permit configuration of a formula or the system components based on user preferences. Moreover, when changes are made to one variable of a formula, traditional systems do not automatically compensate for such changes in all other variables to ensure a consistent formula is batched and delivered to the plants. Finally, these systems do not have safeguards in place to stop delivery of nutrients to a plant when the system or a component thereof malfunctions. Therefore, there exists a need for an improved nutrient injection system.

BRIEF DESCRIPTION OF THE DRAWINGS

Other advantages of the present invention will be readily appreciated as the same becomes better understood by reference to the following detailed description when considered in connection with the accompanying drawings wherein.

Corresponding reference characters indicate corresponding parts throughout the drawings.

SUMMARY OF THE INVENTION

Figure 1:
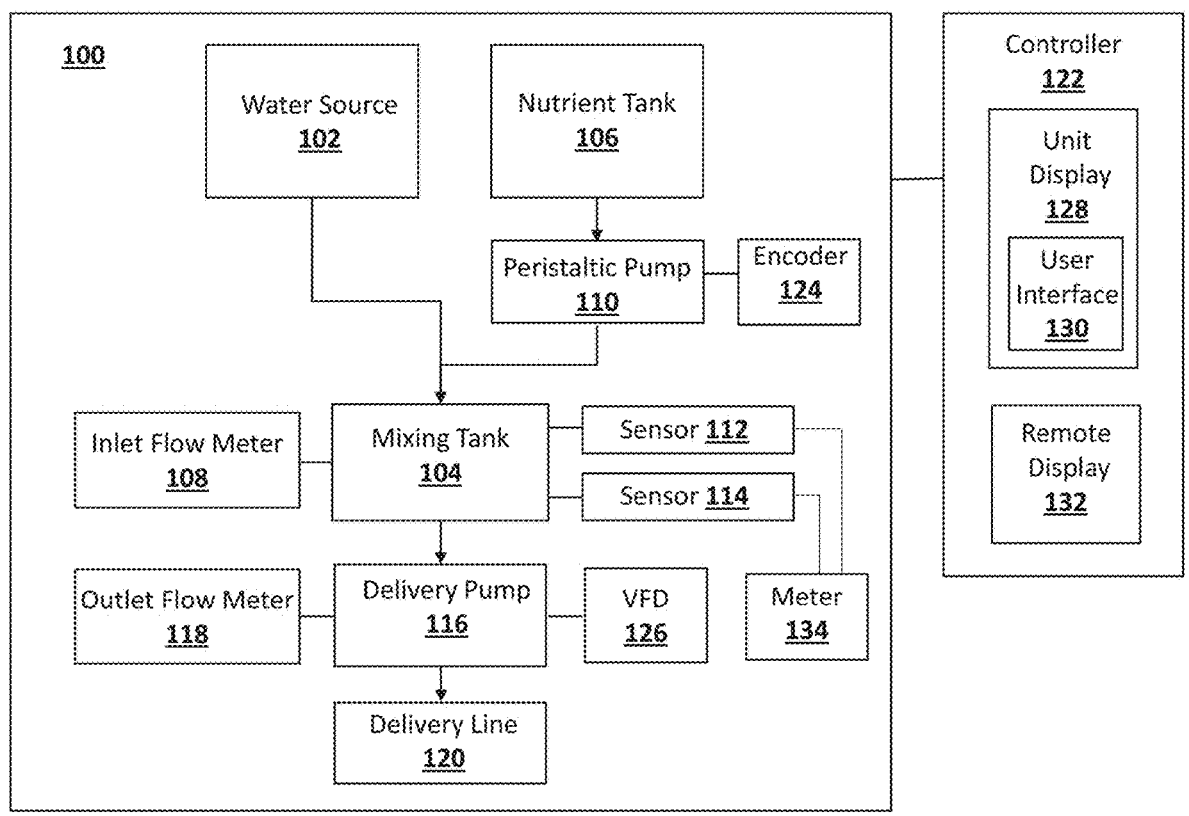
FIG. 1 illustrates a block diagram of an automated nutrient injection system.

In one aspect of the present invention, an automated nutrient injection system is provided. The automated nutrient injection system comprises a nutrient mixing and delivery system coupled to a controller. The nutrient mixing and delivery system is configured to mix a predefined formula comprised of at least one nutrient and water. The controller is configured to receive, store, and execute user-defined settings of the nutrient mixing and delivery system. The controller comprises a remote display, wherein the remote display is viewable on a device physically remote from the nutrient mixing and delivery system.

In another aspect of the present invention, an automated nutrient injection system is provided. The automated nutrient injection system comprises a nutrient mixing and delivery system coupled to a controller. The nutrient mixing and delivery system includes a first tank configured to hold a nutrient, a second tank configured to hold a volume of water and a volume of the nutrient, a first pump configured to pump the nutrient from the first tank to the second tank, a first meter configured to measure the volume of water and the volume of the nutrient pumped into the second tank, a second pump configured to receive the formula, a second meter configured to measure a volume of the formula received by the second pump from the second tank, and at least one delivery line configured to receive the volume of the formula from the second pump and deliver the volume of the formula to at least one zone. The controller is configured to receive, store, and execute user-defined settings of the nutrient mixing and delivery system.

In yet another aspect of the present invention, an automated nutrient injection system is provided. The automated nutrient injection system comprises a nutrient mixing and delivery system coupled to a controller. The nutrient mixing and delivery system includes at least one nutrient tank configured to hold a nutrient, at least one mixing tank configured to hold a volume of water and a volume of the nutrient, a peristaltic pump configured to pump the nutrient from the at least one nutrient tank to the at least one mixing tank, an inlet flow meter configured to measure the volume of water and the volume of the nutrient pumped into the at least one mixing tank, a first sensor configured to detect a pH of a formula created by the volume of water and the volume of the nutrient mixed in the at least one mixing tank, a second sensor configured to detect an electrical conductivity of the formula, a delivery pump configured to receive the formula, an outlet flow meter configured to measure a volume of the formula received by the delivery pump from the mixing tank, and at least one zone delivery line configured to receive the volume of the formula from the delivery pump and deliver the volume of the formula to at least one zone. The controller is configured to receive, store, and execute user-defined settings of the nutrient mixing and delivery system.

DETAILED DESCRIPTION OF THE INVENTION

The present invention overcomes at least some of the disadvantages of known nutrient injection systems. Embodiments of the present invention provide automated nutrient injection systems and method of operating the same. Persons of ordinary skill in the art will realize that the following description of the presently invention is illustrative only and not in any way limiting. Other embodiments of the invention will readily suggest themselves to such skilled persons.

Referring now to FIG. 1, a block diagram illustrating an automated nutrient injection system is shown. A system 100 comprises a water source 102, a mixing tank 104, a nutrient tank 106, an inlet flow meter 108, a peristaltic pump 110, an analytical pH sensor 112, an analytical electrical conductivity sensor 114, a delivery/mix pump 116, an outlet flow meter 118, a zone delivery line 120, and a controller 122.

Figure 2:
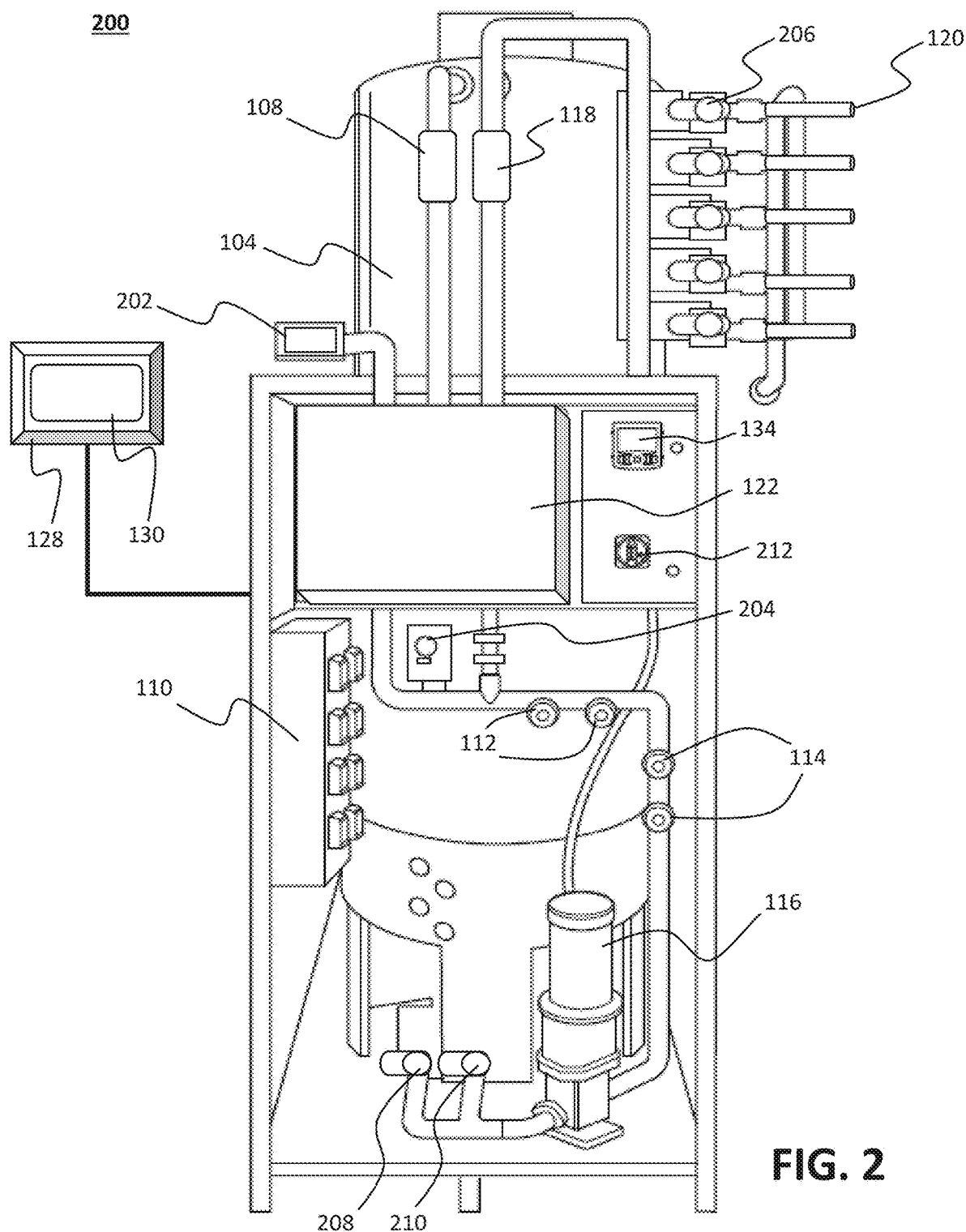
FIG. 2 is a perspective view of an illustrative automated nutrient injection system according to one embodiment.

Referring now to FIG. 2, a perspective view of an illustrative automated nutrient injection system according to one embodiment is shown. Automated nutrient injection system 200 includes components of system 100 and controller 122 of FIG. 1, and further comprises a plurality of valves, including a fill valve 202, a recirculation/fill valve 204, a discharge valve 206, and a drain valve 208, which will be discussed in further detail below. Valves 202, 204, 206, and/or 208 may be solenoid valves, such as a 24 VDC valves.

Referring again to FIG. 1, mixing tank 104 may be any size tank. In one embodiment of the present invention, mixing tank 104 comprises a 200-gallon tank. It will be understood that mixing tank 104 may be any size depending on the amount of plants being serviced. Moreover, it will be understood that system 100 may comprise more than one mixing tank 104. In one embodiment, system 100 comprises five mixing tanks 104, each capable of holding a different fluid mixture. In some embodiments, depending on the size of mixing tank 104, mixing tank 104 may be integrated with other components of system 100. In other embodiments, mixing tank 104 may be remote from other components of system 100.

Inlet flow meter 108 measures the precise volume of water in mixing tank 104. Once mixing tank 104 has reached a target volume of water, inlet flow meter 108 may then measure a rate of recirculation of the fluid. The flow rate of the mixing and/or recirculating fluid in mixing tank 104, as well as the mixing time, may be calibrated based on user preferences. In some embodiments, the user may calibrate the desired flow rate from 1 gallon per minute up to 50 gallons per minute (gpm). A spray ball (not shown) may also be incorporated to ensure complete mixing of nutrients. Thus, mixing tank 104 is essentially self-cleaning tanks such that no residual formula is left behind that may be introduced into another batch. Inlet flow meter 108 eliminates much of the waste present in prior systems by ensuring use of precise volumes of water and formula as they are needed.

Peristaltic pump 110 injects a nutrient from nutrient tank 106 into mixing tank 104. Peristaltic pump 100 may be, for example and not by way of limitation, a 4 roller peristaltic pump. More than one peristaltic pump 110 may be used depending on the number of nutrients being delivered. For example, in one embodiment of the present invention, up to twelve peristaltic pumps 106 may be used, each delivering a different nutrient into mixing tank 104. Nutrients are delivered by peristaltic pump 110 individually to mixing tank 104 to prevent concentrated mixing of nutrients before they contact the water. In one embodiment of the present invention, peristaltic pump 110 produces up to 200 ml/min of nutrients. Optionally, peristaltic pump 110 may further include an encoder 124 to allow even more precise delivery of nutrients into mixing tank 104. Once peristaltic pump 110 has been calibrated, the information is saved into the system and it does not need to be readjusted.

Analytical pH sensor 112 and analytical electrical conductivity (EC) or total dissolved solvent (TDS) sensor 114 are redundant sensors used to improve accuracy of nutrient mixing. During mixing of the nutrients, sensors 112 and 114 ensure that each nutrient reaches the proper level before allowing the next nutrient to be injected. Additionally, the user can preselect a pH value and EC/TDS value of the mixed formula, or the pH of the mixed formula can be set to a default level (for instance, the default level in some embodiments may be between 5.5 and 5.8 pH). Some nutrients raise or lower the pH, so the system balances the pH to the preselected or default pH level as the nutrients are mixed. In one embodiment, system 100 may be capable of "smart" pH balancing. Once the nutrients have been added to mixing tank 104, the system 100 will learn how much of the nutrient it takes to balance the pH of a formula and store that data for future use, which will speed up the mixing process the next time that formula is mixed. A sensor meter 134 may be coupled to sensors 112 and 114.

After the nutrients are mixed, sensors 112 and 114 may ensure that these values are maintained and detect any variances from the preselected values so that correction can be made. Sensors 112 and 114 are easily accessible for routine maintenance and calibration. Sensors 112 and 114 may be calibrated/verified periodically by the user (e.g., once a month, once every two weeks, etc.) based on the user's preferences.

After the nutrients have been mixed, the mixed formula then enters delivery pump 116. In one embodiment, delivery pump 116 comprises a 2 HP vertical stainless steel pump, controlled via an integrated variable frequency drive (VFD) 126f. It will be understood that any suitable pump may be used. Outlet flow meter 118 confirms the volume of fluid delivered to the plants. Outlet flow meter 118 also confirms the amount of fluid used to flush zone delivery line 120, between the plants and system 100. This is critical to provide the most accurate and complete historical data for the user. The outlet flow meter 118 ensures that a known volume of fluid went from mixing tank 104 to the delivery pump 116 to the plants, and that delivery pump 116 is functioning properly.

Referring again to FIG. 2, a discharge valve 206 releases the fluid (mixed formula or water) from delivery pump 116 to the delivery line 120 for delivery to the plants. Discharge valve 206 may comprise a positive action valve. In existing systems, most valves take between 30 seconds to 1 minute to open or close. Positive action valves, on the other hand, open or close in less than two seconds. This allows delivery of a precise volume to the plants. Once the preselected volume of fluid has been delivered to the plants, discharge valve 206 may automatically close.

Controller 122 may control a plurality of zones, each zone containing a number of plants. The number of peristaltic pumps 106 may depend on the number of zones, i.e., the more zones, the fewer peristaltic pumps 106 and vice versa. In each zone, controller 122 may control numerous factors, including: watering time, nutrient recipe, fluid volume needed for plants, fluid volume needed to flush lines 120, among others.

Controller 122 may comprise a unit display 128 having a user interface 130 for allowing a user to control various aspects of system 100 (see FIGS. 3A-3K). User interface 130 may comprise a touch screen. Controller 122 may further comprise a remote display 132, where the interface of remote display 132 is identical to user interface 130 of unit display 128.

Controller 122 may store a plurality of recipes. In one embodiment, controller 122 may store up to 50 different recipes designed by the user, each having specified EC/TDS and pH values. Controller 122 may allow a user to set up a zone for fluid delivery. To set up a zone, the user may select, among other data: (1) which recipe to use, (2) how many plants are in the zone, and (3) a fluid delivery schedule. System 100 will automatically calculate the volume of fluid (both water and nutrient volumes) and the flow rate needed to meet the zone requirements. In other words, system 100 creates individual formula batching using a preselected formula to determine precise volumes of water and nutrients to be delivered to specific zones at a preselected time.

In calculating the volume, a length of delivery line 120 is taken into account. After delivery of a batch to a zone, the length of delivery line 120 to each zone and a volume of water in that delivery line 120 are both calculated. After a batch is delivered to a zone, system 100 automatically reloads a batch of water to rinse out delivery line 120. The batch of water contains a specific volume of water, with just enough to prevent plugging of delivery line 120, e.g., by nutrients coagulating in delivery line 120. Therefore, because delivery line 120 is rinsed and only a very small amount of excess water is left in the line, no additional (significant) amount of water is delivered to the zone with the next delivery batch. Moreover, there is no need to use special formulas to clean delivery line 120 between uses.

Delivery line 120 each zone may run from a room/area containing the plants to system 100. A. This adds to the initial cost of running the lines (piping), but it saves a significant amount of money over time due to waste prevention. It takes a smaller volume to fill each delivery line 120, and thus a smaller volume of nutrients is required. Moreover, delivery line 120 may be left full between batch deliveries when two zones within the same room/area are utilizing different recipes, which allows the user better control and flexibility over what can be grown in the same room.

System 100 may be capable of automated flushing. The user selects the amount of time a batch can sit in delivery line 120 before it is considered "dirty". Once a delivery line 120 is considered "dirty", system 100 will either flush delivery line 120 automatically, or compensate the next batch to allow the volume of delivery line 120 to be pushed to drain valve 208 by fresh nutrients. Optionally, the user may also select a daily complete flush of all delivery lines 120 and/or mixing tank 104, again using exact amounts of fluids needed to accomplish the complete flush to eliminate waste and uncertainty. The flushed fluids may be expelled via drain valve 208.

In some embodiments of the present invention, up to 50 different recipe choices are available for delivery to up to 10 zones. Systems 100 may be linked together for additional configurations. For instance, if six systems 100 are linked, each capable of storing 50 recipes and delivering to 10 zones, the overall system would be capable of delivering up to 300 different recipes to 60 different zones. Thus, the user could potentially configure a large number of distinct deliveries throughout the day.

Frequently, the plant count in a zone will change over time (e.g., some plants may die while others survive, or plants may be added to a zone). If the plant count changes, the formula needed for that zone will also necessarily change. System 100 automatically compensates for changes in plant count when a change is entered by the user for a specific zone. System 100 will automatically adjust the volume of water and volume of nutrients needed based on the new number of plants.

Controller 122 includes an alarm system for detecting errors or discrepancies within the system 100 and reporting alerts to the user. For instance, if a component (such as pump) fails, or if an error occurs during nutrient mixing (e.g., an incorrect pH value or EC/TDS value), an alarm will be triggered. Controller 122 may, in some embodiments, be configured to automatically pause an action of system 100 in response to the alarm trigger. Controller 122 will display an alarm message on unit display 128 and/or remote display 130. In addition, controller 122 may optionally send the alarm message to the user via email or text message, or any other preferred contact method configured by the user.

Once the user receives the alarm message, the user may have the option to resume an action, abort an action, or pause an action. In one embodiment, the user may also have an option to test various components to determine where the failure occurred. If the user does not respond to the alarm message, the controller 122 may be configured to automatically dump the current batch of formula and attempt to create the correct batch a second time. If the second attempt fails, another alarm will be triggered and a second alarm message may be sent to the user. In the event the user fails to respond to the second alarm message, the controller 122 may be configured to automatically dump the current batch and instead deliver a batch of pure water to the plants. In that way, although the intended formula delivery was unsuccessful, the plants will never be starved. On the other hand, the consequences of sending a batch of fluid with the wrong formula/nutrient content are significant—an entire crop of plants may be destroyed. Therefore, a batch that has triggered an alarm for any reason will never be sent to the plants, unless the alarm is manually overridden by the user.

Controller 122 may additionally allow the user to view levels of nutrient tank 106 in real time. Encoder 124 measures how much of a nutrient is removed from nutrient tank 106 and how much is left. Thus, when a nutrient level is low, controller 122 is able to indicate to the user that the nutrient needs to be added to nutrient tank 106 before it is depleted entirely. In the event that a nutrient has been depleted, a batch that is missing a nutrient will never be sent to the plants. An alarm, as described above, would be triggered.

To prevent an alarm trigger, in one embodiment, when the nutrient level in nutrient tank 106 is low, controller 122 may automatically reorder the nutrient based on the user's preferences, estimated delivery times, and current nutrient usage levels. For example, based on current usage, controller 122 may recognize that five days' worth of nutrient A are remaining, and that delivery of the nutrient takes approximately two days. Thus, at least two days before nutrient A is depleted entirely, controller 122 would place a reorder for nutrient A. Thus, the nutrient would be reordered (and replenished) before the nutrient is depleted from nutrient tank 106.

In one embodiment, controller 122 may send alerts to the user about nutrient and formula levels. Because the precise formulas and delivery schedules are known, controller 122 is able to automatically calculate the number of days left of a particular nutrient or a formula. For instance, controller 122 may send an alert to the user at least 24 hours in advance of any nutrient or formula depletion. In other embodiments, controller 122 may send daily alerts (or alerts based on a user-defined schedule) with current nutrient levels and expected days of formula left, so that the user may reorder or replenish nutrients as needed.

Referring again to FIG. 2, in one embodiment of the present invention, an optional fork sensor 210 may be placed in the basin of nutrient tank 106 or mixing tank 104. Fork sensor 210 maintains a minimum level of fluid so as to prevent peristaltic pump 110 or delivery/mix pump 116 to run dry, therefore eliminating the need to prime the same.

Referring again to FIG. 1, as previously discussed, controller 122 may further comprise remote display 132, where the interface of remote display 132 is identical to user interface 130 of unit display 128. Remote display 132 may be viewed on any device remote from system 100, such as a mobile phone, tablet, or computer. Remote display 132 may be viewed and operated remotely from anywhere in the world, so long as an internet connection is available. Controller 122 may be connected to a power-line communication-based network (PLC network). The PLC network may control delivery pump 116 and peristaltic pump 110.

Remote display 132 may be connected to the PLC network over a virtual private network (VPN), which allows for secure access by permitted users on select devices. Additionally, users may use their own VPN that is already integrated with other, separate systems (e.g., humidity controls or other environmental controls), allowing access to all systems over one VPN. While connected over the VPN, the user may remotely operate and configure most aspects of system 100 via remote display 132, including the operations described with reference to FIGS. 3A-3K. These operations are illustrative and it will be understood that any action available at unit display 128 may also be available on remote display 132. By using a VPN system, the user can also control who has access to remote display 132 or unit display 128, such as employees and technicians. Other security measures, such as rotating password access capabilities, may optionally be employed to further increase security. Thus, the user can prevent unauthorized access to proprietary information, such as recipes, as well as unauthorized modifications to system settings.

If a VPN is unavailable or not preferred, it is also possible to integrate the system 100 through an Ethernet network or other similar, secure network.

In some embodiments, other environmental controls may be integrated into system 100 (e.g., moisture/humidity control, lighting control, $CO_2$ control, etc.). For instance, moisture controls may comprise moisture sensors in plants that trigger an alarm when a moisture level is too low or too high (which may indicate an issue with one of the components of system 100, such as a plugged delivery line 120).

In some embodiments, system 100 may further incorporate a zone lighting schedule. Frequently, a watering schedule depends on lighting, i.e., watering may be done when the lights are off due to improved nutrient absorption. The user may enter into system 100 information about the zone lighting schedule, namely, when the lights will be on and when they will be off. Depending on the user's preferences, the watering delivery schedule may be automatically adjusted to compensate for the lighting schedule (e.g., the system will not water when the lights are on).

Referring again to FIG. 2, system 200 may further comprise a master power switch 212. In some embodiments (not shown), master power switch 212 and/or sensor meter 134 may be integrated into the same unit as controller 122, or they may be kept in separate units as shown in FIG. 2.

Referring now to FIGS. 3A-3K, illustrative user interface screens of an automated nutrient injection system according to one embodiment are shown.

Figure 3A:
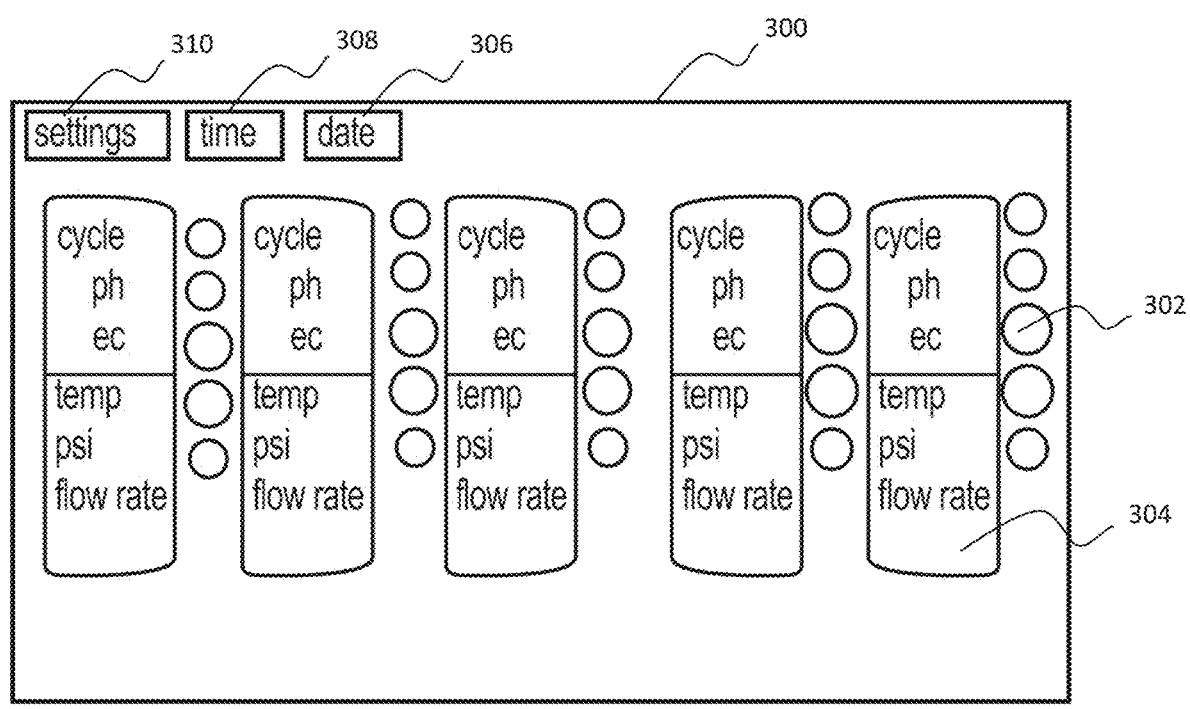
FIGS. 3A-3K illustrate various user interface screens of an automated nutrient injection system according to one embodiment.

Referring now to FIG. 3A, a home screen 300 is illustrated. Home screen 300 features one or more valve indicators 302 to identify a position of various valves, which may include fill valve 202, a recirculation/fill valve 204, discharge valve 206, and drain valve 208 (e.g., OFF, ON, or AUTO). Home screen 300 further features one or more tank indicators 304 to identify real-time information about the contents of a tank (e.g., mixing tank 104), such as but not limited to: whether nutrient mix or fresh water is present, pH values, EC/TDS values, temperatures, psi, and flow rate. In some embodiments, valve indicators 302 and/or tank indicators 304 may be color-coded for quick and easy viewing and reference by the user. Home screen 300 may further comprise a variety of menu buttons, such as date 306, time 308, and other settings 310.

Figure 3B:
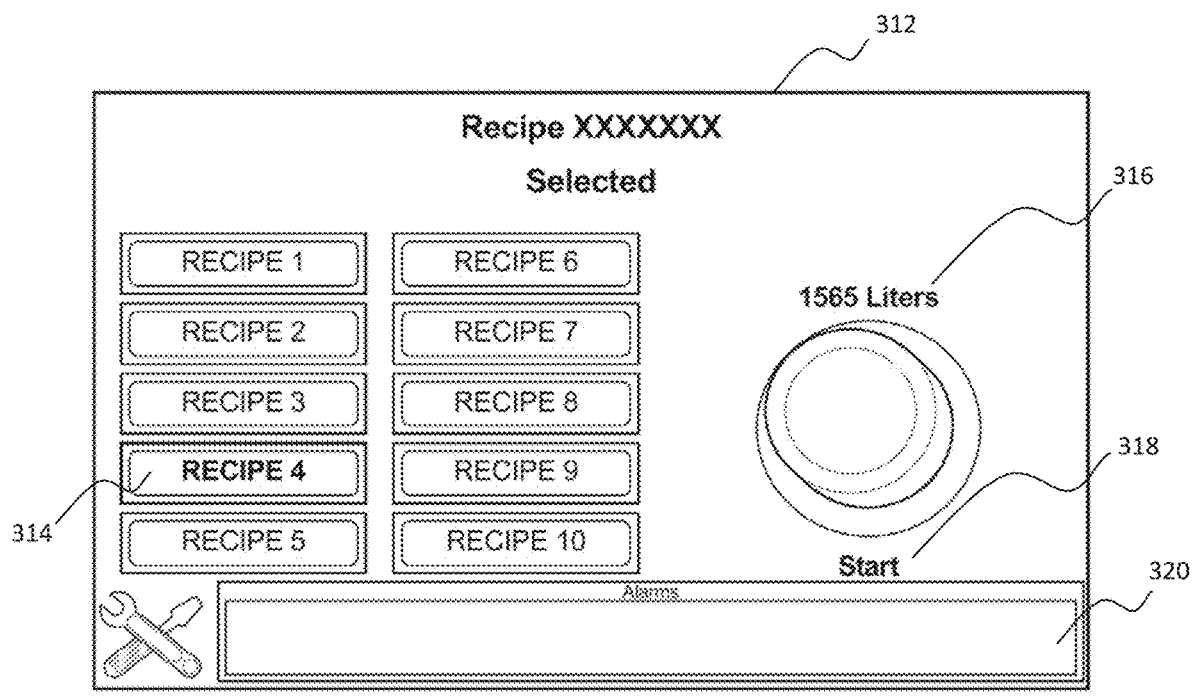

Referring now to FIG. 3B, a recipe screen 312 is illustrated. All available recipes, one of which is labeled 314, are presented to the user for selection. In the illustrated embodiment, ten recipes 314 are available for selection, but it will be appreciated that nay number of recipes may be included on recipe screen 312. After selecting a recipe 314, the user may also enter a volume value 316. If the user does not wish to enter a volume value 316, a predefined default volume value will populate the entry. A start button 318 will commence a sequence when the user selects it. Each recipe 314 will consist of the following sequence: (1) initial fill stage; (2) nutrient stage; and (3) discharge stage. In some embodiments, an alarm message box 320 may appear on the screen. Any errors or omissions in the user's entries will trigger an alarm message to appear in alarm message box 320 (none shown in FIG. 3B).

Figure 3C:
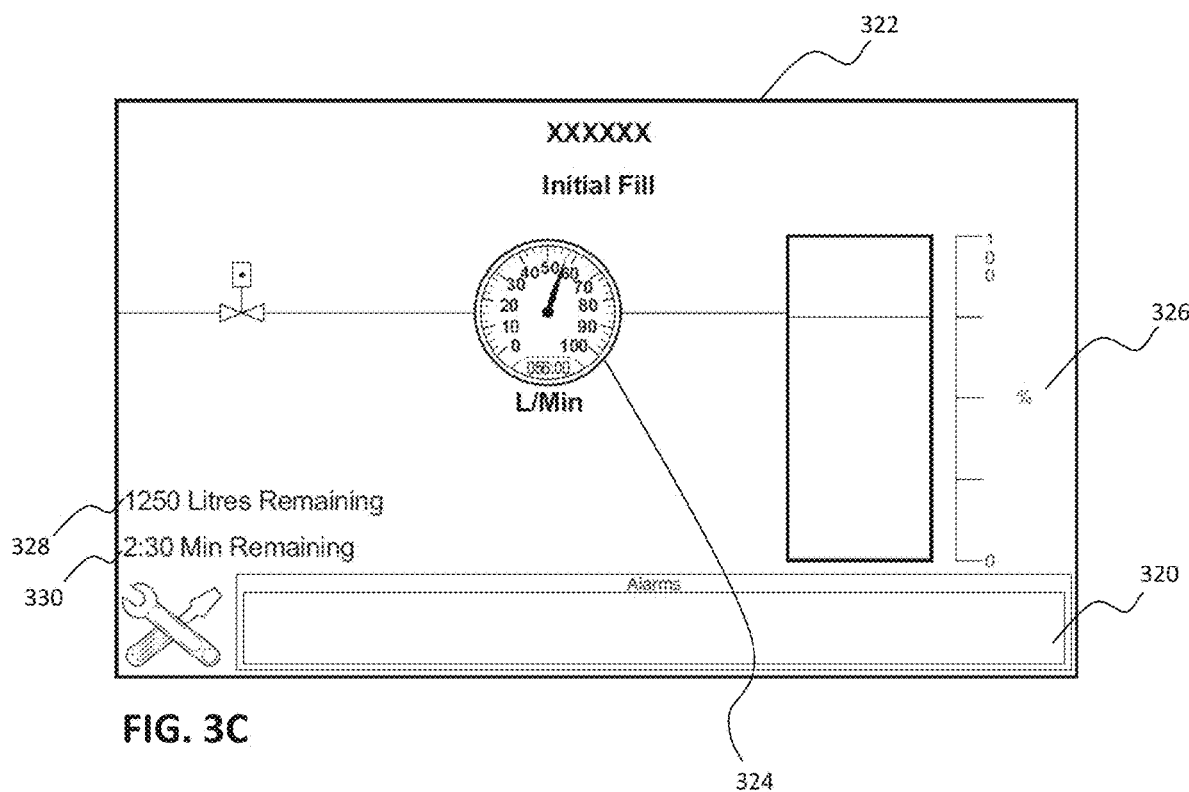

Referring now to FIG. 3C, an initial fill stage screen 322 is illustrated. The initial fill stage may be controlled via fill valve 202 and inlet flow meter 108. An expected flow rate will be verified by inlet flow meter 108. If the flow rate varies from the expected flow rate, an alarm message may be triggered to appear in alarm message box 320, and the initial fill stage may pause. In response to an alarm message, the user may choose to abort or continue the sequence. The flow rate may be illustrated by flow rate indicator 324, and a tank indicator 326 may indicate the progress of the initial fill stage (e.g., by percentage). Additionally, a volume indicator 328 may indicate the volume remaining to complete the initial stage, and a time indicator 330 may indicate the time remaining to complete the initial stage.

Figure 3D:
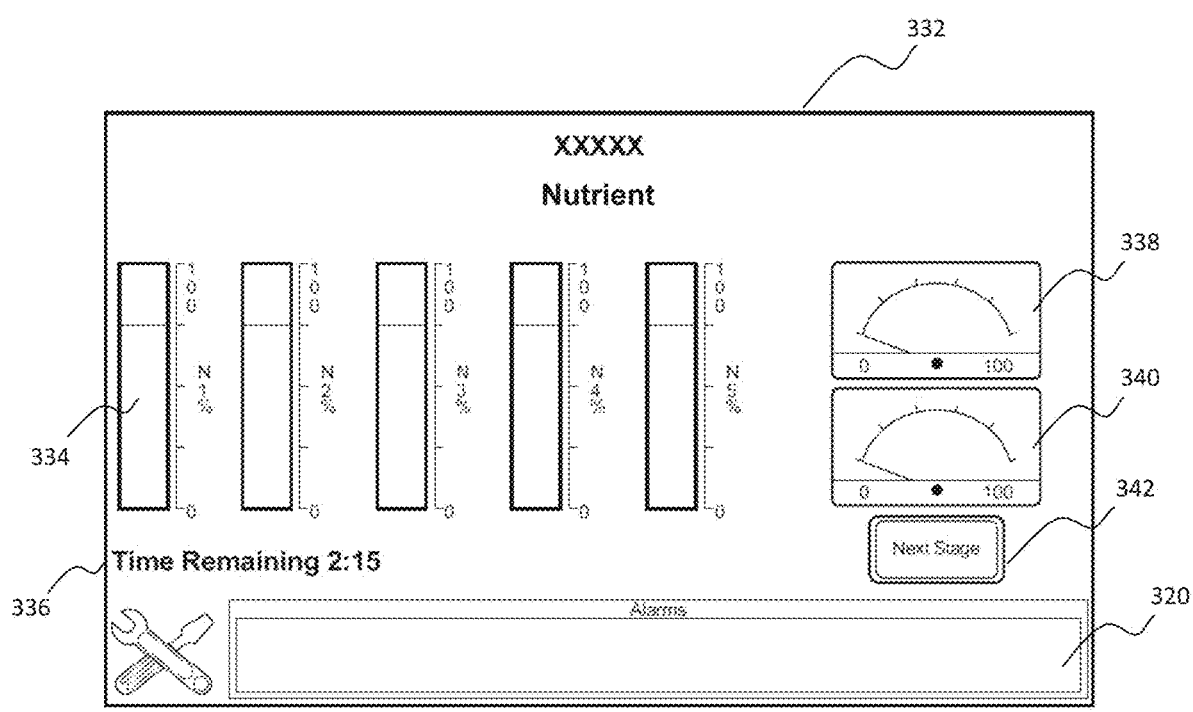

Referring now to FIG. 3D, a nutrient stage screen 332 is illustrated. Once the initial fill stage is complete, the nutrient stage will commence. There may be more than one nutrient stage, depending on the number of nutrients being used (one stage per nutrient). The nutrient injection rate may be illustrated by nutrient injection indicator 334 (e.g., by percentage). Additionally, a second time indicator 336 may indicate the time remaining to complete the nutrient stage. Each nutrient stage will also have predetermined allowable pH limits and EC limits, indicated by pH meter 338 and EC meter 340 (e.g., as measured by analytical pH sensor 112 and analytical EC/TDS sensor 114). If the pH value and/or EC/TDS value varies from the allowable values, an alarm message may be triggered to appear in alarm message box 320, and the nutrient stage may pause. In response to an alarm message, the user may choose to abort or continue the sequence. When the nutrient stage(s) complete, the user may select the next stage button 342 to continue the sequence.

Figure 3E:
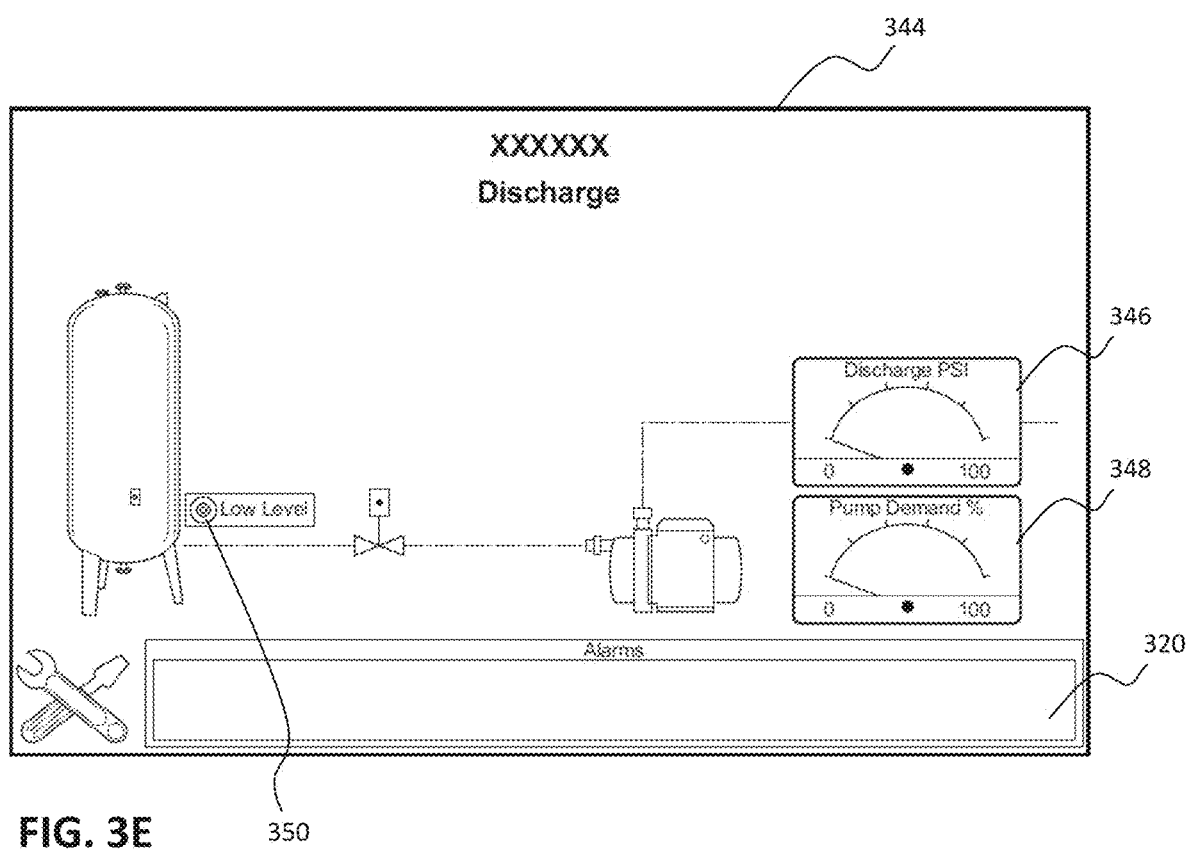

Referring now to FIG. 3E, a discharge stage screen 344 is illustrated. Discharge valve 206 will open and the delivery pump 116 will operate in pressure control via a predetermined, configurable pressure value. The discharge pressure value (e.g., as measured by outlet flow meter 118 or an optional pressure sensor installed at the bottom of mixing tank 104) may be indicated by discharge pressure meter 346. If the discharge pressure value varies from the configured value, an alarm message may be triggered to appear in alarm message box 320, and the discharge stage may pause. In response to an alarm message, the user may choose to abort or continue the sequence. Optionally, the system may be configured by the user such that the discharge stage automatically aborts when the pressure value varies from the configured value. A pump demand value may be indicated by a pump demand meter 348. The discharge stage will be complete when a low level switch 350 is triggered. The low level switch 350 may further act as a sensor to protect delivery pump 116. Once the discharge stage is complete, the system will the move on to a flush and drain sequence to clear the lines.

Figure 3F:
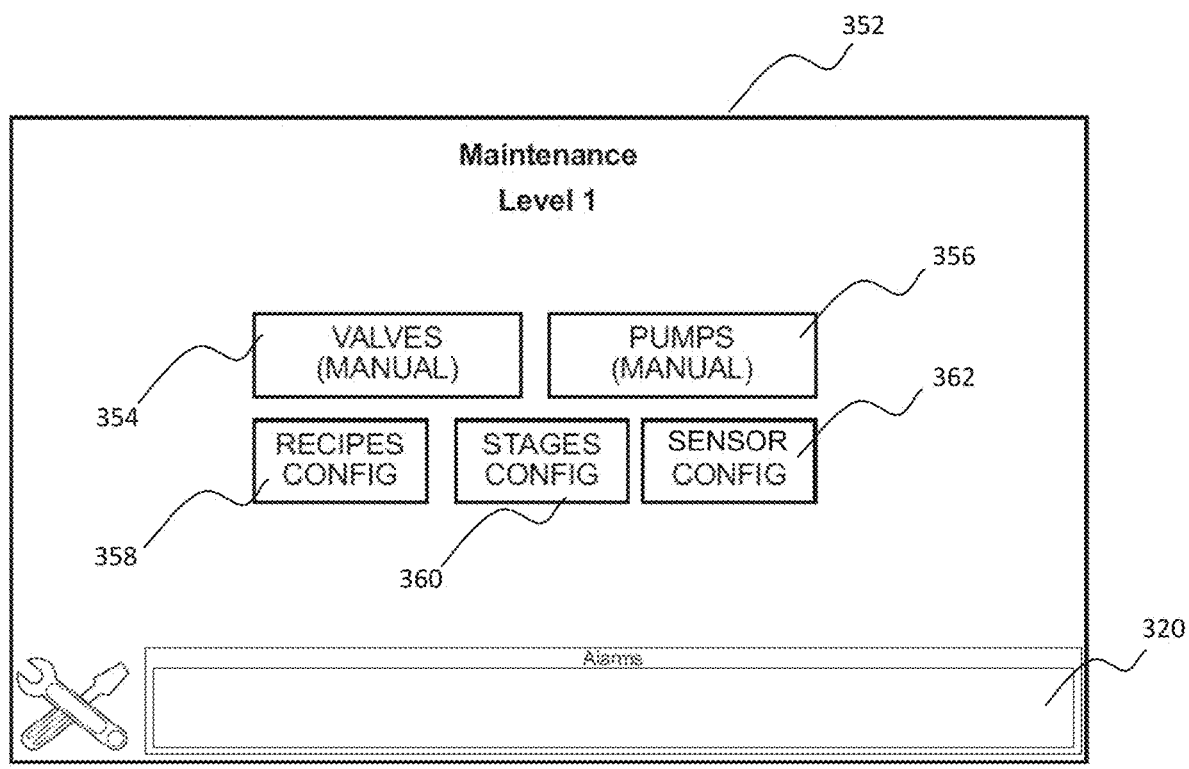

Referring now to FIG. 3F, a configuration maintenance menu screen 352 is illustrated. Configuration maintenance screen 352 may have a variety of menu options for system maintenance, including a valve manual configuration option 354 (see FIG. 3G) and a pump manual configuration option 356 (see FIG. 3H). A recipes configuration option 358 (see FIG. 3I) allows entry and/or modification of a recipe. A stages configuration option 360 (see FIG. 3J) allows entry of stage-specific data, including various preset values, as discussed herein, and other options. A sensor configuration option 362 (see FIG. 3K) allows configuration of the sensors (e.g., analytical pH sensor 112 and analytical EC/TDS sensor 114).

Figure 3G:
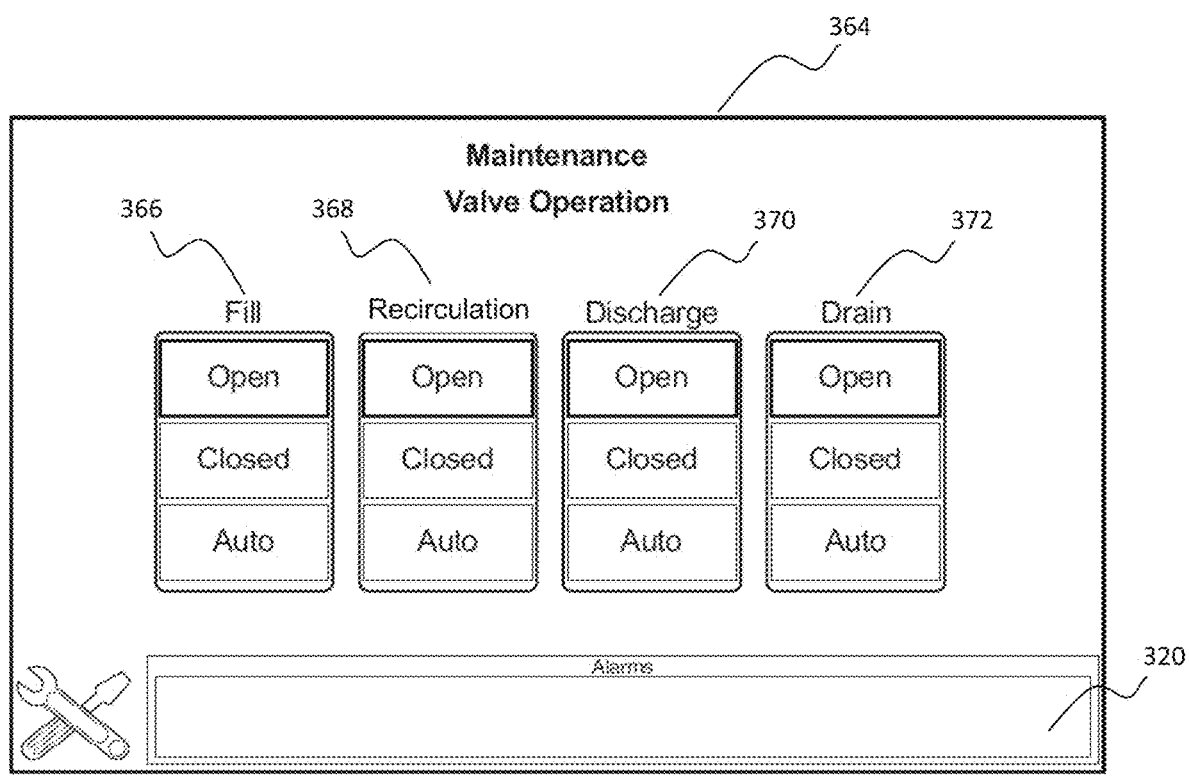

Referring now to FIG. 3G, a valve manual configuration screen 364 is illustrated. Valve manual configuration screen 364 allows the user to control various modes of each valve in the system (e.g., fill valve 202, a recirculation/fill valve 204, discharge valve 206, and drain valve 208), which may include a fill valve control 366, a recirculation/fill valve control 368, a discharge valve control 370, and a drain valve control 372. Each of the controls 366, 368, 370, and 372 have three modes: Manual Run/Open, Disabled/Closed, and System Controlled/Auto.

Figure 3H:
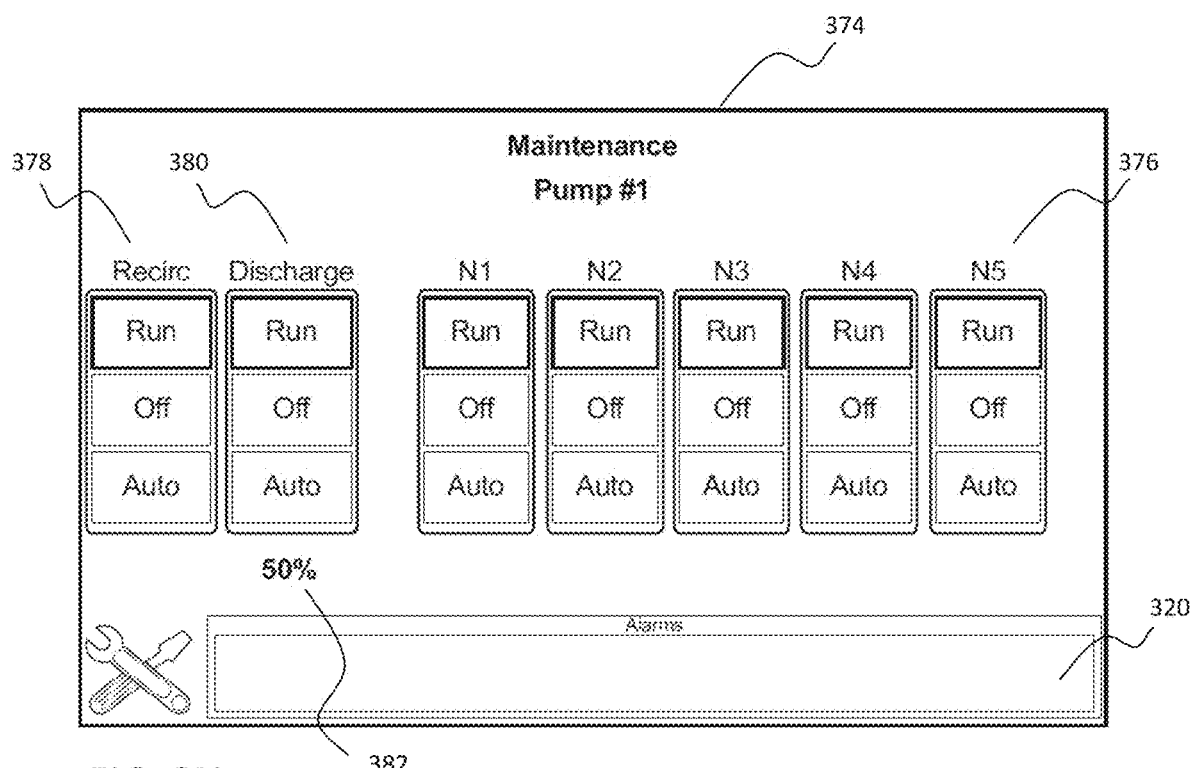

Referring now to FIG. 3H, a pump manual configuration screen 364 is illustrated. Pump manual configuration screen 374 allows the user to control various modes of each pump in the system (e.g., delivery pump 116, peristaltic pump 110), and includes a plurality of nutrient controls, one of which is labeled 376, a recirculation control 378, and a discharge control 380. Each of the controls 376, 378, and 380 have three modes: Manual/Open, Disabled/Closed, and System Controlled/Auto. As the delivery pump 116 is controlled via VFD 126, a command speed 382 can also be adjusted.

Figure 3I:
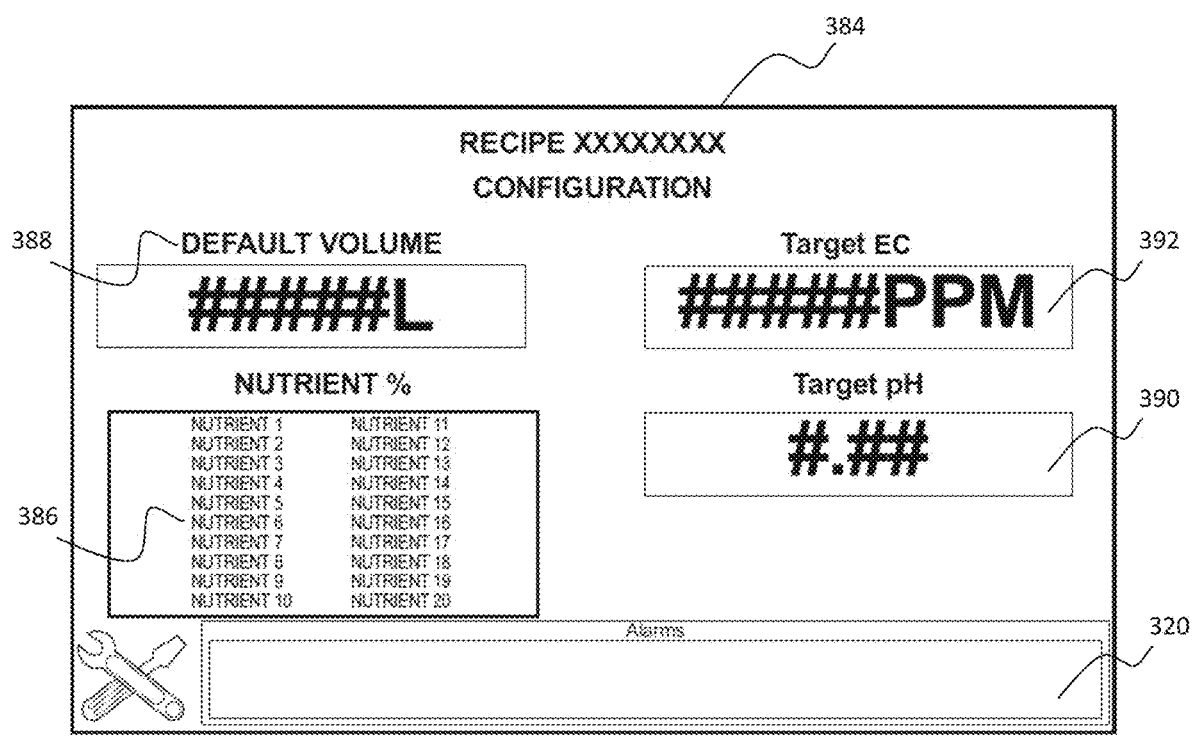

Referring now to FIG. 3I, a recipes configuration screen 384 is illustrated. Each recipe will support a plurality of nutrients, one of which is labeled 386. In the embodiment shown, the recipe can support up to twenty nutrients, but it will be understood that any number of nutrients may be included. Each nutrient may be given a target value that is listed as a percentage of total volume 388. A target value of zero percent will disable that nutrient. The user may also set a predetermined allowable pH value 390 for the recipe and an allowable EC/TDS value 392 for the recipe.

Figure 3J:
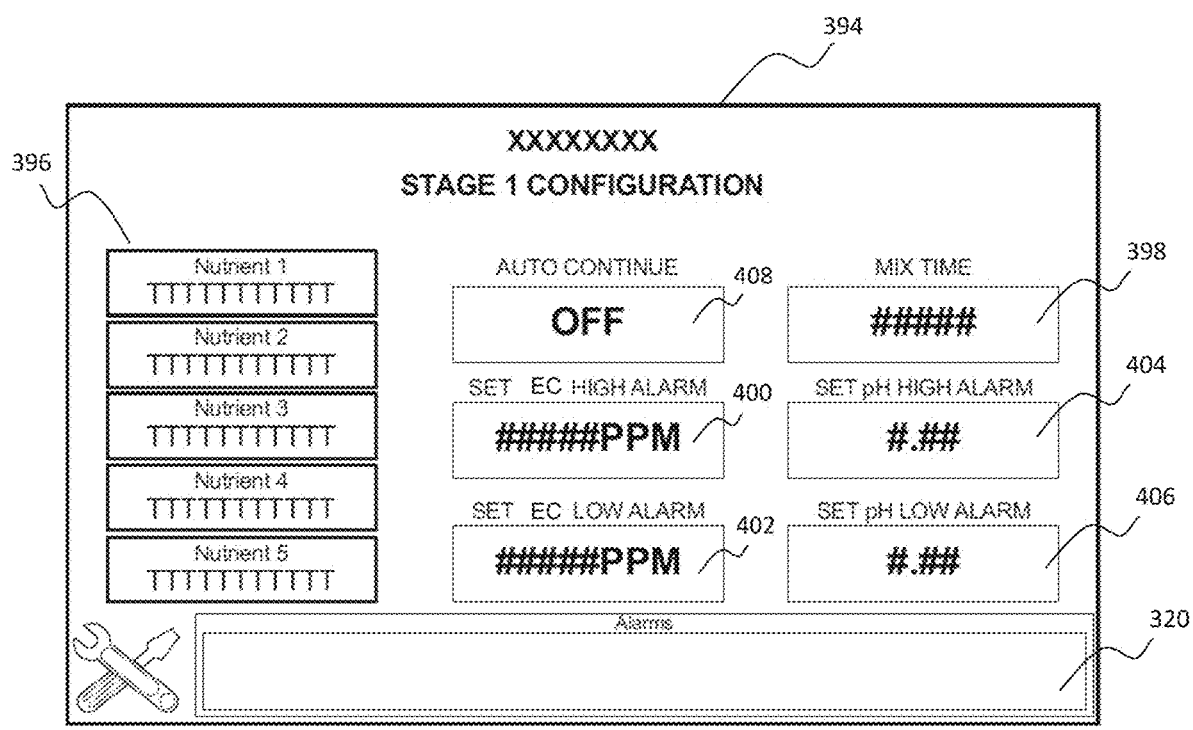

Referring now to FIG. 3J, a stage configuration screen 394 is illustrated. The desired nutrients for each recipe at each stage and the allowable values are configured at stage configuration screen 394, which is identical for each stage. A list of nutrients 396 for a recipe is provided. The user may enter a mix time 398. The user may also set a predetermined allowable high pH value 400 and low pH value 402 for the stage, and a predetermined allowable high EC/TDS value 404 and low EC/TDS value 406 for the stage. As previously described, when the pH values and/or EC/TDS values vary from the allowable values, an alarm message may be triggered to appear in alarm message box 320. Alternatively, the user may set an auto continue option 408, in which the stage would continue uninterrupted.

Figure 3K:
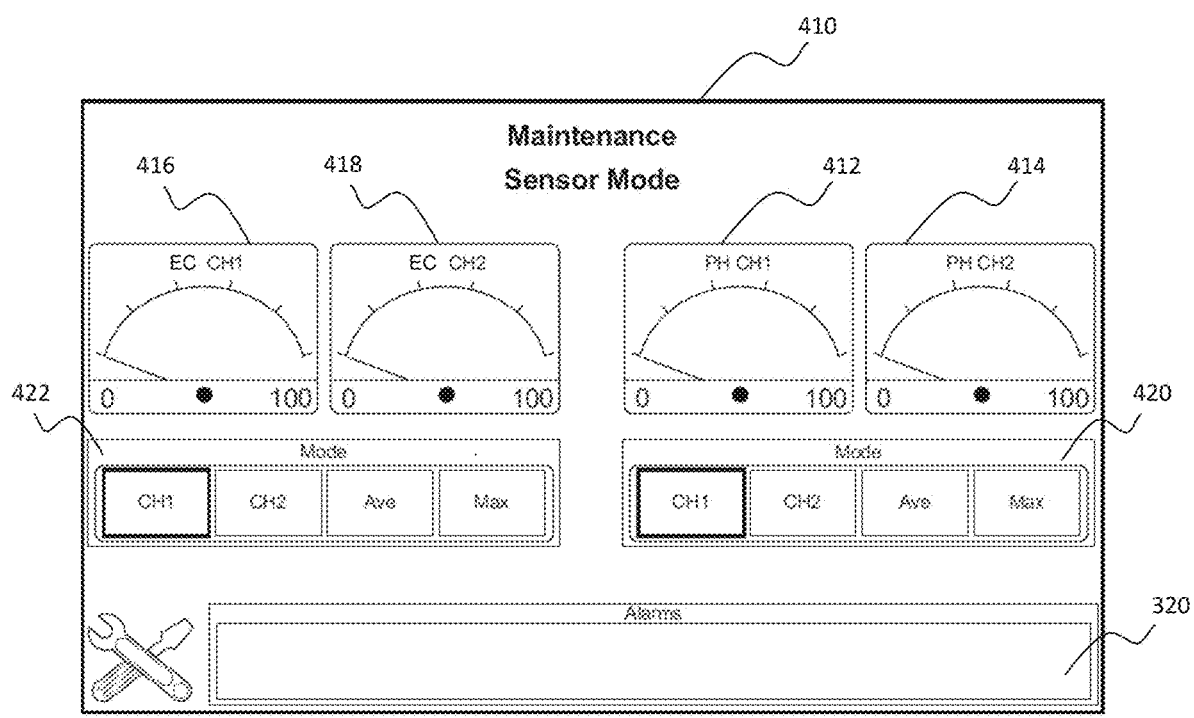

Referring now to FIG. 3K, a sensor configuration screen 410 is illustrated. As system performance is monitored by redundant analytical sensors 112, 114, each channel of each sensor will be evaluated against its redundant partner should the system detect a discrepancy. For example, a first pH sensor channel 412 is evaluated against a second pH sensor channel 414, and a first EC sensor channel 416 is evaluated against a second EC sensor channel 418. In the event of a sensor error, an alarm message may be triggered to appear in alarm message box 320. The user may change a control mode (420, 422) associated with the sensor and continue operation until a replacement or solution is implemented. For example, if one sensor is faulty, the user can switch to the other redundant sensor until the faulty sensor is replaced or repaired. The user may optionally choose to use an average of the two sensors or maximum value measured from the two sensors.

Referring again to FIG. 2, system 100 is designed so that all components are forward-facing for easy access by the user, for operation, cleaning, repair, etc. Moreover, system 100 is designed to fit through any standard door (with the possible exception of mixing tank 104, depending on its size, and which may be integrated with the rest of system 100 or may be remote).

The above description is illustrative and not restrictive. Many variations of the invention will become apparent to those of skill in the art upon review of this disclosure. While the present invention has been described in connection with a variety of embodiments, these descriptions are not intended to limit the scope of the invention to the particular forms set forth herein. To the contrary, the present descriptions are intended to cover alternatives, modifications, and equivalents as may be included within the spirit and scope of the invention and otherwise appreciated by one of ordinary skill in the art.

What is claimed is:
1. An automated nutrient injection system of comprising:
a nutrient mixing and delivery system configured to mix a predefined formula comprised of at least one nutrient and water, the nutrient mixing and delivery system comprising:
a first tank configured to hold a nutrient,
a second tank configured to hold a volume of water and a volume of the nutrient,
a first pump configured to pump the nutrient from the first tank to the second tank,
a first meter configured to measure the volume of water and the volume of the nutrient pumped into the second tank;
a first sensor configured to detect a pH of a formula created by the volume of water and the volume of the nutrient mixed in the second tank,
a second sensor configured to detect an electrical conductivity of the formula,
a second pump configured to receive the formula,
a second meter configured to measure a volume of the formula received by the second pump from the second tank, and
at least one delivery line configured to receive the volume of the formula from the second pump and deliver the volume of the formula to at least one zone; and
a controller coupled to the nutrient mixing and delivery system and configured to receive, store, and execute user-defined settings of the nutrient mixing and delivery system, wherein the controller comprises a remote display viewable on a device physically remote from the nutrient mixing and delivery system.

2. The automated nutrient injection system of claim 1, further comprising:
   a third sensor that is identical to the first sensor; and
   a fourth sensor that is identical to the second sensor.

3. An automated nutrient injection system comprising:
   a nutrient mixing and delivery system including:
      a first tank configured to hold a nutrient,
      a second tank configured to hold a volume of water and a volume of the nutrient,
      a first pump configured to pump the nutrient from the first tank to the second tank,
      a first meter configured to measure the volume of water and the volume of the nutrient pumped into the second tank;
      a second pump configured to receive the formula,
      a second meter configured to measure a volume of the formula received by the second pump from the second tank,
      at least one delivery line configured to receive the volume of the formula from the second pump and deliver the volume of the formula to at least one zone; and
   a controller coupled to the nutrient mixing and delivery system and configured to receive, store, and execute user-defined settings of the nutrient mixing and delivery system.

4. The automated nutrient injection system of claim 3, further comprising:
   a first sensor configured to detect a pH of a formula created by the volume of water and the volume of the nutrient mixed in the second tank.

5. The automated nutrient injection system of claim 3, further comprising:
   a second sensor configured to detect an electrical conductivity of a formula created by the volume of water and the volume of the nutrient mixed in the second tank.

6. The automated nutrient injection system of claim 4, further comprising:
   a redundant sensor identical to the first sensor.

7. The automated nutrient injection system of claim 5, further comprising:
   a second redundant sensor identical to the second sensor.

8. The automated nutrient injection system of claim 3, wherein the zone is comprised of at least one plant.

9. The automated nutrient injection system of claim 3, wherein the controller comprises a display screen.

10. The automated nutrient injection system of claim 9, wherein the display screen of the controller comprises a touchscreen.

11. The automated nutrient injection system of claim 3, wherein the controller comprises a remote display, wherein the remote display is viewable on a device physically remote from the nutrient mixing and delivery system.

12. An automated nutrient injection system comprising:
   a nutrient mixing and delivery system including:
      at least one nutrient tank configured to hold a nutrient,
      at least one mixing tank configured to hold a volume of water and a volume of the nutrient,
      a peristaltic pump configured to pump the nutrient from the at least one nutrient tank to the at least one mixing tank,
      an inlet flow meter configured to measure the volume of water and the volume of the nutrient pumped into the at least one mixing tank;
      a first sensor configured to detect a pH of a formula created by the volume of water and the volume of the nutrient mixed in the at least one mixing tank,
      a second sensor configured to detect an electrical conductivity of the formula,
      a delivery pump configured to receive the formula,
      an outlet flow meter configured to measure a volume of the formula received by the delivery pump from the mixing tank,
      at least one zone delivery line configured to receive the volume of the formula from the delivery pump and deliver the volume of the formula to at least one zone; and
   a controller coupled to the nutrient mixing and delivery system and configured to receive, store, and execute user-defined settings of the nutrient mixing and delivery system.

13. The automated nutrient injection system of claim 12, further comprising:
   a redundant sensor identical to the first sensor.

14. The automated nutrient injection system of claim 12, further comprising:
   a second redundant sensor identical to the second sensor.

15. The automated nutrient injection system of claim 12, wherein the zone is comprised of at least one plant.

16. The automated nutrient injection system of claim 12, wherein the controller comprises a display screen.

17. The automated nutrient injection system of claim 16, wherein the display screen of the controller comprises a touchscreen.

18. The automated nutrient injection system of claim 12, wherein the controller comprises a remote display, wherein the remote display is viewable on a device physically remote from the nutrient mixing and delivery system.

19. The automated nutrient injection system of claim 18, wherein the remote display is in communication with the nutrient mixing and delivery system over a network.

* * * * *